United States Patent [19]
Brennan et al.

[11] Patent Number: 4,485,179
[45] Date of Patent: Nov. 27, 1984

[54] REACTION INHIBITED-SILICON CARBIDE FIBER REINFORCED HIGH TEMPERATURE GLASS-CERAMIC COMPOSITES

[75] Inventors: John J. Brennan, Portland, Conn.; Kenneth Chyung; Mark P. Taylor, both of Painted Post, N.Y.

[73] Assignee: United Technologies Corporation, Hartford, Conn.

[21] Appl. No.: 380,458

[22] Filed: May 20, 1982

[51] Int. Cl.$^3$ .................. C03C 3/22; C04B 35/56; B32B 5/02
[52] U.S. Cl. ........................ 501/32; 428/698; 428/902; 501/88; 501/89; 501/95
[58] Field of Search .............. 501/88, 89, 95, 32, 501/4, 5, 7; 428/114, 367, 398, 428, 432, 698, 902

[56] References Cited
U.S. PATENT DOCUMENTS 3,537,868 11/1970 Kosaka ................................ 501/7
3,977,886 8/1976 Muller ................................ 501/4
4,314,852 2/1982 Brennan et al. ..................... 501/95
4,324,843 4/1982 Brennan et al. ..................... 428/367

FOREIGN PATENT DOCUMENTS 1223193 2/1971 United Kingdom .

Primary Examiner—Mark Bell
Attorney, Agent, or Firm—Harry J. Gwinnell

[57] ABSTRACT

A silicon carbide fiber reinforced glass-ceramic matrix composite is disclosed having high strength, fracture toughness, and improved oxidative stability even at high temperature use, e.g., in excess of 1000° C. The composite is made up of a plurality of glass-ceramic layers, each layer reinforced with a plurality of unidirectional continuous length silicon carbide or discontinuous SiC fibers. The composite is formed by starting with the matrix material (preferably lithium aluminosilicate) in the glassy state and converting it from the glassy state to the crystalline state after densification of the composite. Ta or Nb compounds are added to the matrix composition prior to consolidation to form a reaction or diffusion barrier around the SiC fiber, resulting in composites with high temperature oxidation stability. Substitution of at least part of the $Li_2O$ in the matrix with MgO results in an even higher temperature stable composite, e.g., up to about 1200° C.

2 Claims, 1 Drawing Figure

REACTION INHIBITED-SILICON CARBIDE FIBER REINFORCED HIGH TEMPERATURE GLASS-CERAMIC COMPOSITES

TECHNICAL FIELD

The field of art to which this invention pertains is fiber reinforced composites.

BACKGROUND ART

Because of the scarcity and increasing expense of many conventional high temperature structural metals, increased attention has focused on non-metal containing composites as replacement for conventional high temperature metal-containing materials. Use of metal replacement, high strength fiber reinforced resin and even high strength fiber reinforced metal matrix composites has progressed to the point of commercial acceptance in products ranging from sporting goods to advanced jet aircraft components. One of the big problems with these composites, however, has been their maximum use temperature.

Ceramic, glass, and glass-ceramic bodies are known to the art which can be employed in high temperature applications. Unfortunately, however, those bodies frequently lack the mechanical strength desired and are invariably deficient in toughness and impact resistance. This situation has given rise to the preparation of composite bodies consisting of a matrix of ceramic, glass, or glass-ceramic material with inorganic fibers dispersed in continuous or discontinuous fashion therewithin.

Nevertheless, while such composites, for example, graphite fiber reinforced glass and alumina fiber reinforced glass, can be utilized at higher use temperatures than conventional high temperature structural metals, there is still much room for improvement. To illustrate, while the graphite fiber reinforced glass composite demonstrates high levels of strength, fatigue resistance, and fracture toughness, it is also susceptible to detrimental fiber oxidation at elevated temperatures. And while composites such as alumina fiber reinforced glass are oxidatively stable at high temperatures, the overall strength and toughness levels obtainable with these composites are less than those possible with a graphite reinforced glass system, for example. Similarly, high strength and toughness properties have been obtainable with silicon carbide fiber reinforced glass composites (note U.S. Pat. No. 4,314,852) and silicon carbide fiber reinforced ceramic composites (note U.S. Pat. No. 4,324,843).

Although glass-ceramic bodies customarily exhibit greater refractoriness and strength than their precursor glasses, there has been the desire to impart even higher mechanical strengths thereto. However, silicon carbide fibers have demonstrated a tendency to react with glass-ceramic matrices at high temperatures, which phenomenon has been a limiting factor in their utility as reinforcing elements. Accordingly, what is needed in the art is a composite with high strength, high fracture toughness, and oxidation stability at high temperatures.

DISCLOSURE OF INVENTION

The present invention is directed to a solution to the high temperature strength, fracture toughness, and oxidation stability problems which exist with composites of the prior art and comprises silicon carbide fiber reinforced glass-ceramic composites, wherein said glass-ceramic matrices have compositions within the base $Li_2O-A_2O_3-SiO_2$ system and contain $As_2O_3$ and $Nb_2O_5$ and/or $Ta_2O_5$.

The high strength composites according to the present invention comprise silicon carbide fibers in a glass-ceramic matrix wherein the tantalum and/or niobium ions in the matrix react during composite fabrication with the surface of the silicon carbide fibers to form reaction-inhibiting, diffusion barrier layers thereon. The fibers can be laid in continuous or discontinuous fashion in the matrix and result in composites with high strength (e.g., much greater than the matrix itself) and oxidative stability even at high temperatures (e.g., in excess of 1000° C. and, preferably, up to 1200° C.) for prolonged periods of time.

The foregoing, and other features and advantages of the present invention, will become more apparent from the following description and accompanying drawing.

BRIEF DESCRIPTION OF DRAWING

The Figure shows a fiber reinforced composite according to the present invention.

BEST MODE FOR CARRYING OUT THE INVENTION

A glass, which can be converted to a glass-ceramic, is the ideal matrix material to form the composites of the present invention. During composite densification the matrix is retained in the glassy state, thus avoiding fiber damage and promoting densification under low applied pressure. After densification to the desired fiber plus matrix configuration, the glassy matrix can be converted to the crystalline state, the degree and extent of crystallization being controlled by the matrix composition and heat treatment schedule employed. A wide variety of glasses could be used in this manner; however, limitation on the amount and activity of titanium present in the glass is preferred since the titanium appears to compete with the niobium and tantalum in reacting with the silicon carbide fibers, resulting in a decrease in composite properties. Thus, titanium is capable of reacting with the silicon carbide fiber to form titanium silicides around the silicon carbide fiber, which severely degrade the fiber strength and, as a consequence, the strength and fracture toughness of the composite are greatly lowered. Accordingly, if titania nucleating agents are used, they are preferably inactivated or kept below one percent by weight. This can be accomplished by simply substituting another nucleating agent such as zirconia for the conventional titania or adding an agent to mask the reactivity of the titania toward the silicon carbide fiber. However, in any case it is important to either eliminate or mask the effects of the titania on the silicon carbide fiber to attain a composite with the improved properties disclosed.

In addition to eliminating or masking the effect of titanium on the silicon carbide fibers, to obtain composites with the improved properties disclosed, the addition of either niobium or tantalum ions to the glass-ceramic is necessary. These ions promote the formation of either a niobium carbide or tantalum carbide reaction barrier layer around the silicon carbide fibers during the composite fabrication step. This reaction barrier prevents any interaction between the glass-ceramic matrix and the silicon carbide fibers at elevated temperatures (about 900° to about 1200° C.) in air or other oxidizing environment.

Glass-ceramics having base compositions within the lithium aluminosilicate system are well known to the art. Such compositions demonstrate low coefficients of thermal expansion and, hence, are particularly advantageous in those applications where thermal shock resistance in a major concern. Such compositions are capable of use in high temperature applications, viz., in excess of 1000° C., and, with minor additions of such compatible metal oxides as BaO and MgO, at temperatures up to 1200° C. Desirably, as stated above, $TiO_2$ will be essentially absent from the composition or its effects upon the SiC fiber masked. $ZrO_2$ has been found to perform well as a nucleating agent in amounts up to about 5% by weight.

The levels of niobium and/or tantalum in the matrix composition should be adequate to form the necessary diffusion or reaction barrier on the SiC fiber. While 3–5% by weight, expressed in terms of $Nb_2O_5$ and/or $Ta_2O_5$, has been found to constitute the preferred range, amounts between about 1–10% are operable. If too little is used, a complete reaction barrier will not form; if too much is used, although in minor amounts it would not be detrimental to the matrix, ultimately it could crystallize out to form a phase in the matrix which may exert an adverse effect upon the properties of the composite. It will be recognized, of course, that inasmuch as a NbC and/or TaC coating is developed upon the SiC fibers during fabrication of the composite, the levels of niobium and/or tantalum in the structure of the glass-ceramic matrix will be somewhat less than those in the precursor glass.

The most preferred compositions to serve as matrices for SiC fibers are disclosed in U.S. application Ser. No. 380,464, filed concurrently herewith by the present applicants. Those compositions, exhibiting resistance to oxidation and providing in situ protection from SiC-glass interaction via the effect of $As_2O_3$ as an oxygen buffer and the formation of NbC and/or TaC at the SiC-glass interface and/or the development of a very thin protective layer around the SiC fiber consist essentially, expressed in terms of weight percent, of:

| | |
|---|---|
| $Li_2O$ | 1.5–5.0 |
| $Al_2O_3$ | 15–25 |
| $SiO_2$ | 60–75 |
| $As_2O_3$ | 0.5–3.0 |
| $Ta_2O_5$ | 0–10 |
| $Nb_2O_5$ | 0–10 |
| $Ta_2O_5 + Nb_2O_5$ | 1–10 |
| $ZrO_2$ | 1–5 |
| MgO | 0–10 | with the preferred level of $Li_2O$ being 2–3.5% the preferred MgO content being 1.5–6%, and the preferred maximum of $ZrO_2$ being 3%.

Those compositions are crystallized in situ by exposure to temperatures of about 750°–1200° C. As can be appreciated, the time of exposure to achieve a highly crystalline body is dependent upon the temperature utilized. However, dwell periods ranging between about 0.25–24 hours are common.

In general, the inventive process contemplates the starting materials as being present in the form of glass powders. Where the feedstock is present in crystalline form, it will be necessary to melt the material, to cool the melt sufficiently rapidly to form a glass body, and, thereafter, to comminute the glass to a powder preferably passing through a No. 325 U.S. Standard Sieve (44 microns).

An important facet of the invention is to select glass-ceramic matrix materials such as those described above which can be densified (in combination with the silicon carbide fibers) in the glassy state with a viscosity low enough to permit complete densification with subsequent transformation into a substantially complete crystalline state providing a composite with a use temperature in excess of 1000° C. It is also possible to convert the starting crystalline powder to the glassy state during preheat treatment prior to application of pressure for densification.

Any silicon carbide fiber system with the requisite strength can be used, although a multi-filament silicon carbide yarn with an average filament diameter up to 50 microns is preferred and yarn with average filament diameter of 5 to 50 microns is especially preferred. Nippon Carbon Company of Japan produces such a yarn with about 500 fibers per tow and an average fiber diameter of about 10 microns. The average strength of the fiber is approximately 2000 MPa (300,000 psi), and it has a use temperature of up to 1500° C. The yarn has a density of approximately 2.6 grams per cc and an elastic modulus of approximately 221 GPa ($32 \times 10^6$ psi).

In a key step according to the present invention a reaction or diffusion barrier is formed around the silicon carbide fibers to insure the integrity of both the fiber and the matrix. This reaction barrier is formed by adding certain ions to the glass composition. The ions added (a) must be soluble in the glass melt, (b) must have a higher negative free energy of formation for a carbide than a silicide, and (c) must not form a stable matrix silicate phase (i.e., must be available to react with the fibers). Tantalum and niobium ions have been found to satisfy these criteria. Where a composite containing silicon carbide fibers is formed via hot pressing, it has been found that these ions react with the silicon carbide fibers to form a thin carbide reaction or diffusion barrier around the fibers. Note FIG. 1 where A is the silicon carbide fiber, B the tantalum or niobium carbide barrier layer, and C the matrix material. The thin carbide barrier layer formed does not degrade the silicon carbide fiber; in fact, it prevents the usual degradation of fiber strength that occurs during hot pressing and prevents fiber-matrix reaction that normally occurs in the presence of oxygen at temperatures in excess of 950° C. The tantalum and niobium are preferably added to the glass-ceramic constituents prior to batch melting for uniformity of dispersion, although they may be added after batch melting. And while the oxides of tantalum and niobium are preferred, any glass soluble forms of the compounds may be utilized.

If a composite with discontinuous fibers is to be made, the fibers are chopped to paper length (e.g., about 1.0 to about 3.0 cm) by any conventional means and formed into sheets by conventional papermaking techniques.

While the silicon carbide paper may normally be isotropically laid, i.e., a substantially equal number of fibers in-plane in every direction, the fiber laying can be favored in a particular in-plane direction in preparation of an article when it is known that such article will be receiving stress primarily in a single direction. However, to insure the improved properties of composites of the present invention, such favored laying should not exceed about 90% of the total fiber laying, the fibers should be laid in-plane, and the average fiber length should preferably be about 1 to about 3 cm.

The composites of the present invention are preferably formed in the case of the discontinuous fiber-containing composites by cutting the formed paper to the desired composite shape followed by papermaking binder removal, for example, by solvent immersion or touching each ply to a Bunsen burner flame to burn off the binder. The plies are next either dipped into a slurry of the glass or simply stacked with layers of powdered glass placed between each ply sufficient to substantially fill the spaces between the plies. The formed articles are then hot pressed at elevated temperature to form the composites.

The preferred method for forming the articles of the present invention is by hot pressing the mixture of silicon carbide fibers and glass powder as mentioned above. This method gives particular design flexibility in orienting the fibers, and sheets formed by such method are peculiarly adapted to hot pressing into desired shapes. An exemplary method comprises continuously unwinding a roll of silicon carbide paper, continuous fiber, or yarn from a spool at a moderate rate of speed and passing such fibers through a slip of the powdered glass, solvent, and plasticizer to impregnate the fibers. The impregnated fibers can then be rewound onto a larger rotating spool. An exemplary slip composition may be composed of 130 gm of powdered glass and 390 ml of propanol. An alternative composition may comprise 100 gm of the glass, 200 ml of water, and 100 ml of a latex binder such as RHOPLEX®. RHOPLEX® is a resin suspension or dispersion marketed by Rohm and Haas, Philadelphia, Pa. Excess glass and solvent can be removed by pressing a squeegee against the drum as it winds. Preferably, the ground glass is sized so that 90% of it passes through a −325 mesh sieve. The thus impregnated tape is then dried either at ambient temperature or with a radiant heat source to remove solvent. Where an organic binder or other higher melting organic adjuvant has been utilized, it may be necessary to fire the tape at somewhat elevated temperatures to burn out the organic materials prior to hot pressing.

Following impregnation, the sheets of fibers are removed from the drum and cut into strips to conform to the dimensions of the article to be fabricated. Where hot pressing is utilized to form the composite, that operation may be undertaken, preferably either under vacuum or an inert gas, such as argon, in metal dies coated with colloidal boron nitride, or graphite dies sprayed with boron nitride powder, at pressures up to about 10,000 psi, the preferred range being about 1000–2000 psi, and temperatures of about 1100° C.–1500° C. Time of hot pressing will vary depending on composite makeup, but generally will be accomplished between about 1 minute and 1 hour. Higher pressures permit the use of lower temperatures and shorter dwell times. Silicon carbide fiber loading in the composite is preferably about 15% to about 70% by volume. The mold can also be vibrated to ensure uniform distribution of the glass powder over the laid fiber surfaces. Processing by starting with the matrix material in the glassy state to permit composite densification by hot pressing, followed by converting the glass into the crystalline state, largely contributes to the superior properties of the resulting composite. If, after hot pressing, any significant portion of the matrix material is found to be in the glassy state, further heat treatment may be necessary to substantially completely crystallize the matrix for optimum high temperature performance. And, although it is preferred to have the matrix material in the fully crystalline state, acceptable composite properties are attainable even if some of the matrix is retained in the composite in the glassy state, e.g., up to 25% by weight. Nevertheless, the greatest degree of refractoriness will normally be exhibited where the glass content of the matrix is very low.

The processing parameters and composition of the material used can vary widely, depending upon the ultimate use of the article. While it is not necessary to lay the plies in any particular direction, it has been found that the best strength properties for discontinuous fiber reinforced glass-ceramic matrix composites appear to be obtained when each individual ply, in the case of the non-woven articles, is laid up in the same direction, i.e., all plies are aligned during layup to keep colinear their original orientation with regard to the paper roll axis.

In the case of the continuous fiber composites, the fibers can be laid up relative to one another in alternating ply stacks in any sequence desired, e.g., each layer with fibers unidirectional (0° orientation), alternating plies of fiber oriented 0° and 90° or 0°/30°/60°/90°, 0°/±45°/90°, etc.

To illustrate the processing parameters and the desirable properties demonstrated by the inventive products, the following working examples were carried out.

EXAMPLES

A continuous tow of silicon carbide fibers provided by Nippon Carbon Company as described above was run through a Bunsen burner flame to burn off the sizing. The tow was then run through a slurry of lithium aluminosilicate glass powder in propanol, said glass having the composition recorded in Table I. The glasses of Table I are reported in terms of parts by weight on the oxide basis, but, because the sum of the components totals or closely approximates 100, for all practical purposes the values listed may be deemed to reflect weight percent.

TABLE I

|  | 1 | 2 | 3 | 4 |
| --- | --- | --- | --- | --- |
| $SiO_2$ | 69.2 | 65.6 | 65.9 | 67.2 |
| $Al_2O_3$ | 21.1 | 20.0 | 20.1 | 20.5 |
| $Li_2O$ | 3.1 | 2.9 | 3.0 | 3.0 |
| $MgO$ | 1.9 | 1.8 | 1.8 | 1.8 |
| $ZnO$ | 1.1 | 1.0 | 1.0 | 1.1 |
| $ZrO_2$ | 1.6 | 1.9 | 1.5 | 1.6 |
| $BaO$ | 0.8 | 0.7 | 0.8 | 0.8 |
| $Nd_2O_3$ | 0.2 | 0.2 | 0.2 | 0.2 |
| $Na_2O$ | 0.2 | 0.2 | 0.2 | 0.2 |
| $K_2O$ | 0.1 | 0.1 | 0.1 | 0.1 |
| $As_2O_3$ | 0.7 | 0.7 | 0.6 | 0.6 |
| $Nb_2O_5$ | — | — | 4.8 | 2.9 |
| $Ta_2O_5$ | — | 5.0 | — | — |

An exemplary slip composition comprised 130 grams of powdered glass in 390 milliliters of propanol. Preferably, the glass is ground so that 90% of it passes through a −325 mesh sieve. After passing through the slurry, the tows are collected on a rotating drum to form a fiber "tape" impregnated with the glass powder. The impregnated fiber tapes can be either air dried or dried with a radiant heat source such as a heating blower to remove solvent. The resulting impregnated tapes were laid about 16 layers deep in a die assembly for consolidation at elevated temperature. Hot pressing consolidation was performed at 1450° C. at a pressure of about 6.9 MPa ($1 \times 10^3$ psi) for about 15 minutes in vacuum (about $10^{-4}$ Torr). The resultant composites contained about 50% by volume silicon carbide fibers, the remainder consisting of lithium aluminosilicate glass-ceramic. The samples were about 0.10 inch (0.25 cm) thick.

Table II recites the flexural strength displayed by the composites both immediately after the hot pressing consolidation and after samples of the composites had been subjected to subsequent heat treatments in an air atmosphere. Measurements were conducted at room temperature (RT) and at 1000° C. Observations of the fiber-matrix interface obtained via examination thereof with a light microscope are also recorded.

TABLE II

| | 3-pt Flexural Strength of Composites Unidirectional Fiber Orientation | | | | | |
|---|---|---|---|---|---|---|
| | RT Bend Strength (ksi) | | 1000° C. Bend Strength (ksi) | | | |
| Example | As-Pressed | 900° C. 24 hrs. | 1050° C. 2 hrs. | 900° C. 24 hrs. | 1050° C. 2 hrs. | Comments |
| 1 | 89 | 88 | 68 | 130 | 88 | Much fiber/matrix reaction after 1050° C., 2 hrs., air |
| 2 | 115 | 112 | 112 | 115 | 110 | No fiber/matrix reaction after 1050° C., 2 hrs., air |
| 3 | 129 | 118 | 120 | 136 | 158 | No fiber/matrix reaction after 1050° C., 2 hrs., air |
| 4 | 118 | 110 | 101 | 119 | — | No fiber/matrix reaction after 1050° C., 2 hrs., air |

A comparison of the values reported for Example 1 with those of Examples 2–4 clearly indicates the improvement in strength and in high temperature stability that the inventive composites demonstrate over those of the prior art. This circumstance is especially evident after exposures to temperatures in excess of 1000° C.

As is noted in Ser. No. 380,464, supra, additions of up to 10% by weight total of such extraneous metal oxides as BaO, CaO, $Fe_2O_3$, $K_2O$, $Na_2O$, $Nd_2O_3$, SrO, and ZnO may be incorporated into the base $Li_2O$-$A_2O_3$-$As_2O_3$-$SiO_2$-$Nb_2O_5$ and/or $Ta_2O_5$ compositions to modify the melting and forming capabilities and/or the physical properties of the inventive products, the amount of each being so limited as to avoid any substantial adverse effect upon the properties desired. Thus, in general, the levels of the individual oxides will be held below 5% and, most preferably, below 3%.

Ser. No. 380,464 also observes that very refractory glass-ceramic bodies can be prepared by replacing up to 60 mole percent of the $Li_2O$ content with MgO. However, to insure the production of uniformly fine-grained, highly crystalline articles, at least about 2% $Li_2O$ and 1.5% MgO will most desirably be present in the composition.

We have found that matrices consisting essentially solely of $Li_2O$, MgO, $A_2O_3$, $As_2O_3$, $SiO_2$, $Nb_2O_5$ and/or $Ta_2O_5$ can be utilized to prepare SiC fiber-containing composites that have use temperatures of up to 1200° C. Table III sets forth several glass compositions, expressed in terms of weight percent on the oxide basis, illustrative of precursors suitable for conversion to such highly refractory glass-ceramic matrices.

TABLE III

| | 5 | 6 | 7 | 8 | 9 |
|---|---|---|---|---|---|
| $SiO_2$ | 67.0 | 68.5 | 66.8 | 68.2 | 66.8 |
| $Al_2O_3$ | 19.5 | 20.0 | 19.5 | 19.9 | 19.5 |
| $Li_2O$ | 2.9 | 2.9 | 1.9 | 2.0 | 1.9 |
| MgO | 2.6 | 2.6 | 3.8 | 3.9 | 3.8 |
| $ZrO_2$ | 2.0 | 2.0 | 2.0 | 2.0 | 2.0 |
| $As_2O_3$ | 1.0 | 1.0 | 1.0 | 1.0 | 1.0 |
| $Nb_2O_5$ | — | 3.0 | — | 3.0 | 5.0 |
| $Ta_2O_5$ | 5.0 | — | 5.0 | — | — |

Composite bodies were prepared from glass powders of those glasses in like manner to the procedure outlined above with respect to the glasses of Table I. Table IV reports the flexural strength evidenced by those composites in like manner to Table II, viz., measurements conducted on aspressed samples and specimens subjected to subsequent heat treatments in an air environment. To illustrate the higher refractoriness of these matrices, measurements were carried out at room temperature and at 1200° C.

TABLE IV

| | 3-pt Flexural Strength of Composites Unidirectional Fiber Orientation | | | | | | |
|---|---|---|---|---|---|---|---|
| | RT Bend Strength (ksi) | | | | 200° C. Bend Strength (ksi) | | |
| Example | As-pressed | 900° C. 24 hrs. | 1050° C. 2 hrs. | 1100° C. 2 hrs. | 900° C. 24 hrs. | 1050° C. 2 hrs. | 1200° C. 1 hr. |
| 5 | 115 | 98 | 88 | — | 82 | — | 86 |
| 6 | 112 | 122 | 115 | 108 | 88 | 90 | 113 |
| 7 | 85 | 100 | 94 | 111 | 95 | 120 | — |
| 8 | 141 | 134 | 125 | 136 | — | — | 124 |
| 9 | 129 | — | 115 | 125 | — | 100 | 131 |

Composites formed from Examples 5–9 exhibit strengths at 1200° C. which are three to four times greater than composites prepared from Examples 1–4, as well as demonstrating excellent strengths at room temperature. Composites made from Examples 5–9 also retain their strengths after exposure for 24 hours in air to temperatures of 1100° C. and higher.

By unidirectional is meant all the silicon carbide fibers are oriented in each individual layer in substantially the same axial direction (±5°). By uniaxial is meant that each layer in the composite is oriented such that all the unidirectionally laid fibers in all layers are oriented in substantially the same axial direction (±5°).

Based on the composition of the matrix material, the particular fiber reinforcement, and the process of forming the composite, an article with exceptional high strength, fracture toughness, and oxidation resistance especially at high temperatures is obtained. Each continuous fiber reinforced layer of the composite, regardless of the number of layers or orientation, has an axial flexural strength greater than 80,000 psi and, in most instances, greater than 100,000 psi. As for fracture toughness, although specific fracture toughness measurements have not been made on the composites of the present invention, it is anticipated that each layer will have a critical stress intensity factor ($K_{IC}$) greater than $10 \times 10_3$ psi $\sqrt{in}$. This is clearly superior to any known ceramic material currently available and, with the high temperature strength and oxidative stability of the composites of the present invention, is superior at temperatures greater than 1000° C. than similar glass, glass-ceramic, or ceramic composites not containing reaction-inhibiting Nb and/or Ta ions.

It is particularly noteworthy that, even after initial fracture, composites of the present invention retain a substantial fraction of their original untested strength. This resistance to fracture, even in the presence of initiated damage, is distinctly different from the brittle nature of conventional ceramic articles.

The reinforced ceramics of the present invention have particular utility in environments where oxidation resistance, high strength, and toughness are required, and, because those properties are retained in a high temperature environment (e.g., in excess of 1000° C. and even in excess of 1200° C.), the inventive composites are eminently suitable for use in such applications as a gas turbine engine or internal combustion engine environment, and in high temperature structural ceramic components.

Although this invention has been shown and described with respect to detailed embodiments thereof, it will be understood by those skilled in the art that various changes in form and detail thereof may be made without departing from the spirit and scope of the claimed invention.

We claim:

1. A silicon carbide fiber reinforced glass-ceramic composite exhibiting use temperatures in excess of 1000° C. consisting essentially of about 15% to about 70% by volume silicon carbide fibers implanted within a glass-ceramic matrix consisting essentially of, expressed in terms of weight percent on the oxide basis, about

| | |
|---|---|
| $Li_2O$ | 1.5-5 |
| $Al_2O_3$ | 15-25 |
| $SiO_2$ | 60-75 |
| $As_2O_3$ | 0.5-3 |
| $Ta_2O_5$ | 0-10 |
| $Nb_2O_5$ | 0-10 |
| $Ta_2O_5$ and/or $Nb_2O_5$ | 1-10 |
| $ZrO_2$ | 1-3 |
| $MgO$ | 0-10 | said fibers having a reaction-inhibiting, diffusion barrier coating of niobium carbide and/or tantalum carbide thereon.

2. A composite according to claim 1 exhibiting use temperatures up to 1200° C., wherein $Li_2O$ is present in an amount of 2-3.5%, and MgO is present in an amount of 1.5-6%.

* * * * *